United States Patent [19]

Swift et al.

[11] 4,388,434

[45] Jun. 14, 1983

[54] LITHOGRAPHIC INK VEHICLE CONTAINING ADDITION POLYMER AND ALIPHATIC HYDROCARBON SOLVENT

[75] Inventors: Graham Swift, Bluebell; Harry J. Cenci, Warminster, both of Pa.; Raymond F. Jenkins, Masonville, N.J.

[73] Assignee: Rohm and Haas Company, Philadelphia, Pa.

[21] Appl. No.: 214,057

[22] Filed: Dec. 8, 1980

Related U.S. Application Data

[60] Division of Ser. No. 5,930, Jan. 24, 1979, which is a continuation-in-part of Ser. No. 893,646, Apr. 4, 1978, abandoned, which is a continuation of Ser. No. 766,391, Feb. 7, 1977, abandoned.

[51] Int. Cl.$^3$ .................................................. C08K 5/01
[52] U.S. Cl. ........................................ 524/476; 524/88; 524/474; 524/484; 524/548; 524/553; 524/554; 526/260; 526/281; 526/282
[58] Field of Search ............... 260/33.60 A, DIG. 38; 526/260, 282, 281; 524/476, 474, 484, 490, 88, 548, 553, 554

[56] References Cited

U.S. PATENT DOCUMENTS

| | | | |
|---|---|---|---|
| 3,681,298 | 8/1972 | Hurwitz et al. | 260/30.6 |
| 3,716,524 | 2/1973 | Cenci | 204/159.22 |
| 3,764,537 | 10/1973 | Zunker | 260/33.4 R |
| 3,940,353 | 2/1976 | Martorano | 260/22 CB |
| 4,131,572 | 12/1978 | Brendley | 260/17 R |
| 4,133,793 | 1/1979 | Lewis et al. | 526/210 |

FOREIGN PATENT DOCUMENTS

772746 4/1937 United Kingdom .

OTHER PUBLICATIONS

Nakajima, pp. 98–107, "Polymer Mol. Wt. Methods", Adv. in Chemistry Series #125, ACS 1973, Editor Erzin.

Billmeyer, "Characterization of Mol. Wt. Distrib. in High Polymers", J. Poly. Sci. PTC #8, pp. 161–178, (1965).

*Primary Examiner*—Melvyn I. Marquis
*Assistant Examiner*—Herbert J. Lilling
*Attorney, Agent, or Firm*—Michael B. Fein

[57] ABSTRACT

The specification discloses a lithographic ink vehicle containing an addition copolymer of ethylenically unsaturated monomers having a critical calculated second order transition temperature ($T_g$), and a critical molecular weight, utilizing as the essential solvents in the ink a predominantly aliphatic hydrocarbon having a kauributanol value of between about 18 and 31, preferably between about 21 and 28, in which the polymer must be soluble. Among the preferred monomers are isobornyl methacrylate and isobutyl methacrylate. Other ethylenically unsaturated monomers may be included, particularly functional monomers in small amounts having acid or amine groups.

10 Claims, No Drawings

LITHOGRAPHIC INK VEHICLE CONTAINING ADDITION POLYMER AND ALIPHATIC HYDROCARBON SOLVENT

RELATED APPLICATIONS

This application is a division of Ser. No. 5,930, filed Jan. 24, 1979 which was a continuation-in-part of Ser. No. 893,646, filed Apr. 4, 1978, which was a continuation of Ser. No. 766,391, filed Feb. 7, 1977. Ser. No. 766,391 and 893,646 are now abandoned.

BACKGROUND OF THE INVENTION

Lithography, literally "writing on stone" was discovered in the eighteenth century by Alois Senefelder. Senefelder noticed that a certain kind of stone absorbed both oil and water. He wrote on the stone with a grease crayon and observed that water was absorbed on the non-greasy area. Subsequently, when the rolled the stone in ink, the greasy portion only absorbed the ink. Then by rolling the inked-stone on paper, an image was transferred. (Wolfe, *Printing and Litho Inks* (6th ed.) p. 299).

Today, the lithographic printing process uses metal sheet which is roughened and sensitized to yield hydrophilic and hydrophobic areas. Lithography is usually reserved for high quality printing, such as advertising and packaging. It is divided basically into two types, heat-set and quick-set. The latter type of ink is applied at ambient temperature and dries by wicking of solvent into the paper.

The lithographic ink users consider that resins for quick-set inks should have the listed qualities:

(1) Magie Oil (aliphatic hydrocarbon) solubility
(2) Fast-drying without energy input
(3) Compatibility with alkyd varnishes
(4) Low odor
(5) Pigment dispersing functionality
(6) Good transfer properties
(7) Anti-skinning, i.e., non-oxidative curing.

Copolymers containing isobornyl methacrylate, one of the preferred monomers of the invention, are shown in various prior disclosures. The following three patents, for example, are assigned to the assignee of the present application. Martorano U.S. Pat. No. 3,940,353 shows a copolymer containing 40 to 60% by weight of isobornyl methacrylate and having an average molecular weight of between 1,000 and 8,500. They are utilized as pigment dispersants and lacquer and in blends with materials such as alkyds, vinyl resins and cellulose ester resins. The materials shown in the examples of that patent are insoluble in aliphatic hydrocarbons, although if styrene is substituted for methyl methacrylate, they possibly could be soluble in certain cases.

Another patent concerned with isobornyl methacrylate is Cenci et al. U.S. Pat. No. 3,485,775. It discloses polymers containing 25-75 parts isobornyl methacrylate and 70-25 parts of methyl methacrylate, which detract from hydrocarbon solubility of the polymer. Small amounts (up to 10% of the weight of the other two monomers) of styrene, ethyl acrylate, or butyl acrylate are permitted. The disclosed molecular weight range of the polymers of this reference is between 10,000 to 2,000,000.

Hurwitz et al. U.S. Pat. No. 3,681,298 discloses polymers having a molecular weight range of 1,000 to 8,500, containing 40-60% isobornyl methacrylate and 40-60% of methyl methacrylate, styrene, s-butyl methacrylate, or n-butyl methacrylate, and up to 5% of an unsaturated acid, and the use of solvents comprising or consisting of paraffins, e.g., octane. Amounts of monomers such as methyl methacrylate for such low molecular weight polymers do not appear to be particularly critical; thus about 50% methyl methacrylate is useful. Pigments are disclosed.

Acrylic copolymers for inks are also known, as shown for example in U.S. Pat. Nos. 3,271,347 (Aronoff et al.) and 3,764,587 (Zunker). The inherent viscosity of the polymer of the latter patent, a measure of molecular weight, is between 0.2 and 0.35 measured at 25° C. using 25 milligrams of polymer in 5 cc of chloroform, which suggests a $\bar{M}w$ of 100,000 or greater. The polymer of the Example of Zunker has a calculated $T_g$ of about 43° C. The Aronoff et al. polymer in one embodiment is primarily of vinylidene chloride, with acrylic and methacrylic acid or itaconic acid, with the optional inclusion of other monomers. The vinylidene chloride copolymers have molecular weights in the range of 3,000 to 5,000. Aronoff et al. also mention all-acrylic copolymers, the invention being in the inclusion of polyoxyethylene ethers. No method of preparing the acrylic polymer is disclosed nor are molecular weights. The specific acrylics disclosed have extremely low calculated $T_g$'s. Aronoff et al. disclose solvents including aliphatic hydrocarbons, aromatic hydrocarbons, ketones, alcohols, etc.

U.S. Pat. No. 2,886,549 to Bartl is concerned with aliphatic hydrocarbon (benzine) soluble acrylic polymers for use as lacquers, inks, and textile impregnants. The polymer is solution polymerized at 90° C. and 120° C. which would give a low molecular weight polymer, and molecular weight (not specified) can be controlled with conventional polymerization regulators. The polymers have at least two components, with a third optional component. The first component (50–90 parts) is a cycloalkyl ester of an unsaturated acid such as acrylic acid, methacrylic acid or fumaric acid, etc; the preferred alcohol moiety is, for example, cyclohexanol, mono-, di-, or trimethyl cyclohexanol, or other substituted cyclohexanol. The second component (10–50 parts) is an ester of (meth)acrylic acid with an alcohol of at least eight carbon atoms, preferably 10-18 carbons. The third and optional component (1–20 parts) is a different polymerizable compound such as vinyl acetate, styrene, etc., or one having a reactive aldehyde, epoxy, carboxy, etc. group. Of the examples, Example 1 (80 cyclohexyl methacrylate (CHMA), 20 dodecyl methacrylate (DMA)) gives a polymer with the highest calculated $T_g$ of the examples—just below 30° C. At a theoretical 90 CHMA and 10 DMA ratio, not specifically disclosed, the calculated (not actual) $T_g$ would be about 45° C. As elsewhere herein, unless specified otherwise, the $T_g$ is the calculated value. At an also theoretical 50 CHMA and 50 DMA ratio, this value would be −15° C. Being solution polymerized at high temperatures, the polymer would have a low molecular weight.

A similar disclosure of alkane (ligroine or benzine) soluble acrylic polymers appears in CA. 51, 10925f, mentions a copolymer of 20-40% of a higher alkyl ester such as dodecyl methacrylate or cyclohexyl methacrylate, with styrene and the like. An example is given of a polymer, in parts by weight, of 680 styrene, 320 dodecyl methacrylate, and 200 methyl methacrylate. This would have a calculated $T_g$ of about 36° C. and, because of the polymerization method, a low molecular weight. If it is assumed the polymer is 20 CHMA and 80 styrene, the calculated $T_g$ is about 90° C. whereas with 20 DMA and 80 St the figure is about 50° C. The polymer may be combined with other coating materials such as drying oils, phthalic acid resins, etc.

Another reference of possible interest is U.S. Pat. No. 2,803,611, concerned with an adhesive which contains a blend of a copolymer of lauryl and hexyl methacrylates with limed rosin, a wax-naphthalene condensate and a solvent, particularly a hydrocarbon solvent. These higher methacrylic acid esters give very soft ($T_g < -5°$ C.) polymers.

U.S. Pat. No. 4,005,022 to Vijayendran discloses a liquid toner, for developing electrostatic images, containing (A) 9–99 parts of a saturated aliphatic hydrocarbon havimg a Kauri-butanol number of 25–35, (B) 1–10 parts of an intensifier. The intensifier (B) contains (1) 1–10 parts soap, 80–97 parts aliphatic hydrocarbon, and (3) 3–20 parts of a concentrate. The concentrate (3) contains (a) 8–14 parts pigment, (b) 120–200 parts of an acrylic or other polymer, (c) 180–240 parts saturated hydrocarbon and (d) 0.03–6 parts pigment. The acrylic polymer "Neocryl B-701" mentioned by Vijayendran ("a terpolymer composed of vinyl toluene, i-butyl methacrylate and lauryl or stearyl methacrylate") appears to be similar to the acid-free isobutyl methacrylate-vinyl toluene copolymers of Brown et al. U.S. Pat. No. 3,417,041 (prepared by suspension polymerization using a chain transfer agent to give a low molecular weight). The useful polymers had viscosities in Varsol No. 3 of from 37 to 110 centipoises. Similar waxy polymers made with higher alkyl methacrylates and acids are shown by Finn et al. U.S. Pat. No. 3,532,654 for floor polish emulsions.

Hoshi et al. U.S. Pat. No. 3,912,675 discloses polymers said to have molecular weights of 30,000–300,000 with a $T_g$ of 20°–105° C. in inks using a mixture of an alcohol, an aromatic hydrocarbon, and a glycol ether as a solvent, using a mixture of 5–35 parts acrylic resin with 5–20 parts of a natural resin. An isobutyl methacrylate-acrylic acid copolymer is mentioned. The examples show polymers having intrinsic viscosities of 0.03 and 0.067.

SUMMARY OF THE INVENTION

The present invention is in the discovery that the utilization of an addition polymer containing polymerized ethylenically unsaturated monomers, particularly those prepared from a narrow class of certain monomers, including interpolymers from certain comonomers in critical ratios, along with a particular class of aliphatic hydrocarbons solvents, as an essential component in a printing ink, gives a quick-set ink or a heat-set ink with excellent characteristics, without the need to use additives to provide hardness, such as nitrocellulose, cellulose acetate butyrate, shellac, polyamides, alkyds, and the like.

DETAILED DESCRIPTION

An important quality of such addition polymers is the molecular weight thereof. The molecular weight must be between 1,000 and 15,000, preferably between 4,000 and preferably 15,000, more preferably 12,000, on a weight average basis, ($\overline{M}w$), and between 1,000 and 7,500, preferably between 1,500 and 5,500, on a number average molecular weight basis ($\overline{M}n$), as determined by gel permeation chromatography. Molecular weight is critical since the polymer viscosity at a constant solids content is proportional to molecular weight, particularly $\overline{M}w$. Another important property of the polymer is the $T_g$ thereof, and consequently the selection of monomers and proportions thereof depends upon their influence on the $T_g$. "$T_g$" is a conventional criterion of polymer hardness and is described by Flory, "Principles of Polymer Chemistry," pp. 56 and 57 (1953), Cornell University Press. See also "Polymer Handbook", Brandrup and Immergut, Sec. III, pp. 61–63, Interscience (1966). While actual measurement of the $T_g$ can be used, it is difficult to obtain an accurate value on low molecular weight polymers, and it may be calculated as described by Fox, Bull. Am. Physics Soc. 1,3, p. 123 (1956), or by the use of "Rohm and Haas Acrylic Glass Temperature Analyzer" Publication No. CM-24 L/cb, Rohm and Haas Company, Philadelphia, Pa., 19105, which are incorporated herein by reference. While the actual $T_g$'s of the polymers of the invention are lower than the calculated $T_g$ because of low molecular weights, the calculated $T_g$ values, which are essentially the same as the measured $T_g$'s of high molecular weight (>100,000, $\overline{M}n$) polymers, are relevant indicia of the relative $T_g$'s of different polymers. Examples of the $T_g$ of high molecular weight (>100,000) homopolymers, and the inherent $T_g$ values thereof which permit such calculations, are as follows:

| Homopolymer of | $T_g$ |
|---|---|
| 2-ethylhexyl acrylate | −90° C. |
| n-decyl methacrylate | −60° C. |
| n-butyl acrylate | −56° C. |
| n-tetradecyl methacrylate | −9° C. |
| n-tetradecyl acrylate | 20° C. |
| t-butyl acrylate | 43° C. |
| methyl methacrylate | 105° C. |
| styrene | 100° C. |
| acrylic acid | 105° C. |
| isobornyl methacrylate | 180° C. |

Another critical requirement of the invention is that there be a balance between the second order transition temperature ($T_g$), and molecular weight. The calculated $T_g$ of the polymers according to the invention, having molecular weights within the range specified above, have a value falling between about 40° C. and about 200° C. preferably between about 50° C. and 120° C. The approximate calculated $T_g$ of a high molecular weight homopolymer of isobornyl methacrylate is about 180° C. However, as specified, the actual molecular weight is much lower and thus the actual $T_g$ may be lower than the "calculated" value. The calculated value is given as a significant index of the lower, but relative actual $T_g$, of the low molecular weight polymer. Thus, in addition to monomers such as isobornyl methacrylate, other monomers are used in suitable amounts, particularly those which give polymers having high calculated $T_g$'s, i.e., if prepared as high molecular weight polymers, such polymers would have high $T_g$ values matching the calculated value, provided of course that the low molecular weight polymers of the invention are soluble in the specified low kauri-butanol (KB) value solvents. Examples of other useful monomers are isobutyl methacrylate ($T_g$ 49° C.), tert-butylaminoethyl acrylate ($T_g$ 30° C.), methacrylic acid ($T_g$ 100° C.), dimethylaminoethyl methacrylate ($T_g$ 18° C.), maleic anhydride, itaconic acid, oxazolidinyl ethyl methacrylate, and styrene ($T_g$ 100° C.). Others include dicyclopentenyl methacrylate and acrylate, dicyclopentenylethoxy methacrylate and acrylate, butyl methacrylate ($T_g$ 20° C.), dicyclopentenylneopentoxy methacrylate and acrylate, isobornyl acrylate, and other vinyl aromatics than styrene such as α-chlorostyrene, α-methyl styrene, t-butyl styrene, and vinyl toluene. Methyl methacrylate ($T_g$ 105° C.) can be used, but only in limited amounts, because of limited solubility of polymers containing this monomer. As noted above, such limited amounts can be readily ascertained.

Isobornyl methacrylate and/or isobutyl methacrylate are preferred components of the polymer. When isobornyl methacrylate is utilized in a copolymer, it is used in an amount of about 1 to 40%, more preferably from about 5 to 35%. Where isobornyl methacrylate is omitted, and isobutyl methacrylate is a component of the polymer, usually it is present in an amount of from about 10% to 90%, preferably at least 50% by weight, the remainder preferably being one or more of the other monomers mentioned heretofore, and more preferably one or more of the vinyl aromatics, tert-butylaminoethyl methacrylate, dimethylaminoethyl methacrylate, maleic anhydride, acrylic acid, methacrylic acid, itaconic acid, or oxazolidinylethyl methacrylate. The nitrogen-containing and carboxylic acid containing monomers are used in the very small amounts, if at all, and preferably in an amount of from about 0% to about 5%, preferably at least 0.5% by weight of the total monomers. For example, a copolymer of vinyl toluene/isobutyl methacrylate in the ratio of 50/50, or a polymer of styrene/isobutyl methacrylate in the ratio of 30/70 are useful, with or without the nitrogen containing or carboxylic acid containing monomers in small amounts. The preferred copolymers contain both isobornyl methacrylate and isobutyl methacrylate. Particularly preferred are copolymers or interpolymers containing from 35% to 75% isobutyl methacrylate and from 15% to 40%, more preferably below 35%, isobornyl methacrylate, and any remainder being other ethylenically unsaturated monomers such as styrene, methacrylic acid, dimethylaminoethyl methacrylate and the like.

The polymers are preferably prepared by high temperature solution polymerization, which is known to give low molecular weight polymers, although low molecular weights can be obtained by other methods such as the inclusion of a molecular weight regulator such as an aliphatic mercaptan, for example, n-dodecyl mercaptan. In a preferred polymerization procedure, the low KB (kauri-butanol) aliphatic hydrocarbon solvent is included as at least one of the solvents utilized in the polymerization. For example, the combination of xylenes, or other suitable hydrocarbon, and a hydrocarbon solvent having a KB value of about 25 may be used with a suitable polymerization catalyst or initiator, and the residual monomers and xylene or other hydrocarbon stripped off by distillation after completion of the polymerization.

Another means of obtaining low molecular weight polymers involves the utilization of a particular anionically initiated polymerization procedure, using methanol and e.g., sodium methoxide, in particular using acrylic ester and methacrylic ester monomers. These polymers have an extremely narrow distribution of molecular weights and are prepared by a unique procedure described in U.S. Pat. No. 4,103,093 Lewis et al. application Ser. No. 517,336, filed Oct. 23, 1974 and Ser. No. 629,186, filed Nov. 5, 1975. Each of these is a continuation-in-part of certain parent applications. These applications as well as the parent applications are incorporated herein by reference as describing the methods of obtaining low molecular weight or oligomeric polymers of alkyl acrylates and alkyl methacrylates as well as teaching methods of transesterifying the resulting polymers to obtain for example oxazolidine groups, oxazolidinyl acrylates and methacrylates, isobornyl acrylates and methacrylates and the like. Also well adapted to transesterification is low molecular weight polymethyl methacrylate, utilizing an alcohol such as isobornyl alcohol and a catalyst such as sodium methoxide, and in which the displaced methanol is distilled off, resulting in polyisobornyl methacrylate.

The liquid solvents in the ink are conventional solvents in the printing ink industry, but they find unique applicability when combined with the resins of the invention. The solvents have a KB value of between 18 and 31, preferably between 21 and 28. Typical products have a minimum of about 70% paraffins, i.e., consisting essentially of saturated hydrocarbons with no more than about 25% aromatics, on a weight basis. They may contain small percentages of aliphatic olefins, less than 10%, and preferably less than about 5%. The average molecular weight is between about 160 and 240. They have an initial boiling point of between about 400° and about 600° F., with a final boiling point of between about 475° and 700° F. The preferred initial boiling point is between about 400° and 450° F. with a final boiling point of between 475° and 600° F. The aniline point is between about 150 and 200. Suitable products are obtained from Magie Bros. Oil Company, 9101 Fullerton Avenue, Franklin Park, Ill. 60131. Suitable products are sold as Magie Oil 400, 405, 415, 440, Deo 440, 470, 4600, 500, Deo 520, 535, 5300, 590, 625, and ,eo 620. Other boiling ranges are usable povided the KB value is as specified.

Typical colorants include carbon black, phthalocyanine blue, titanium dioxide, lithol rubine reds, ultramarine blue, hansa yellow, and the like. A suitable pigment:binder ratio is between 0.01:1 and 2:1, weight basis. In some cases, no pigment is necessary.

Determination of the properties of the polymers are by conventional methods. The kauri-butanol value is the number of milliliters of the hydrocarbon or other liquid required to cause cloudiness when added to 20 gms of a solution of kauri gum and butyl alcohol, in which there is 100 gms of kauri gum and 500 gms of butyl alcohol. This is basically ASTM method D-1133, Volume 20.

Molecular weight is determined by gel permeation chromatography, utilizing polymethylmethacrylate for calibration.

Second order transition temperature or glass transition temperature ($T_g$) is the temperature at which the polymer changes from a glassy state to a rubbery state, calculated as noted above.

The ink has excellent scuff and abrasion resistance, blocking resistance and heat-smear resistance even without the polymeric additives noted above, such as the cellulose esters. In addition to good quick-set fast-set and heat-set, and other superior qualities, the products have excellent gloss and excellent adhesion to porous and non-porous substrates. In addition, the resins of the invention are useful for pigment flushing, which flushed pigments can be let down with more of the resin of the invention and formulated into lithographic quick-set and heat-set inks.

SPECIFIC EMBODIMENTS

In the following examples, the monomer abbreviations have the following meanings:

| | |
|---|---|
| iBMA | isobutyl methacrylate |
| iBOMA | isobornyl methacrylate |
| ST | styrene |
| MAA | methacrylic acid |
| VT | vinyl toluene |
| MMA | methylmethacrylate |
| t-BAEMA | tertiary butyl aminoethyl methacrylate |

Also in the examples, the Magie Oil 535 and 470 have the following properties:

| | 470 | 535 |
|---|---|---|
| API gravity | 43.7 | 36.9 |
| Flash °F. | 230 | 285 |
| KB Number | 26.9 | 25.4 |
| Aniline Point °F. | 170 | 173 |
| % Aromatics (wt.) | 10 | 22 |
| % Olefins (wt.) | 5 | 2 |
| % Paraffins (wt.) | 85 | 76 |
| Average Arithmetical Molecular Weight | 205 | 235 |

Regarding typical distillations, Magie Oil 470 has an initial boiling point of 470° F. and a final boiling point of 515° F., while Magie Oil 535 has an initial boiling point of 524° F. and end point of 595° F.

Unless otherwise specified herein, all parts and ratios are by weight. Temperatures are either °C. or °F., as specified.

EXAMPLE I

Preparation of a Polymer of the Composition iBMA/iBOMA/MAA//57/40/3 Wt. %

1. Equipment 5 liter, 4 neck round bottom flask equipped with stirrer, condenser, thermometer and addition funnel with an $N_2$ inlet. The flask is heated with an oil bath.

2. Charges

| A. | Xylene | 239 |
|---|---|---|
| B. | Magie 535 oil | 200 |
| C. | Tertiary butyl perbenzoate (85%) | 51.6 |
| D. | Magie 535 oil | 145 |
| E. | Isobutyl methacrylate | 1000 |
| F. | Isobornyl methacrylate | 701 |
| G. | Methacrylic acid | 53 |
| H. | Tertiary butyl perbenzoate (85%) | 25.8 |
| I. | Magie 535 oil | 50 |
| J. | Magie 535 oil | 744 |

1. Prepare initiator feed (C&D) and monomer feed (E, F, & G)
2. Charge A & B to the flask and heat to 150° C. Maintain an $N_2$ atmosphere throughout the reaction.
3. When heat is at 150° C. begin to add the monomer and initiator feeds. Charge these feeds linearly over 5 hours.
4. When feeds are complete, cool the system to 130° C. over 0.5 hours.
5. At 130° C. chase with (H&I) over 0.5 hr. Hold at 130° C. for 1 hour.
6. Gradually apply vacuum and increase temperature to a maximum of 150° C. and 25 mm. vacuum to remove xylenes and unreacted iBMA.
7. When analytical results indicate that residual monomers are within specifications, cool to 100° C. and dilute to 60% solids with J.

4. Characterization

| | |
|---|---|
| Polymer Solids | 60 ± 2 wt. % |
| Viscosity | ca. 200,000 cps. at 25° C. |
| Color | Clear amber solution, free from particulate matter |
| Calculated $T_g$ = 93° C. | |
| $\overline{M}n$ = 4300 | |
| $\overline{M}w$ = 9500 | |

EXAMPLES II-V

By a similar procedure to that described the polymer compositions shown below and with the given properties are obtained as solutions in either Magie Oil 535 or 470 as shown.

| | Composition (wt. %) | Solvent | Viscosity/ Solids |
|---|---|---|---|
| II | iBMA/iBOMA/ST/MAA 40/18/40/2 Calculated $T_g$ = 89° C. $\overline{M}n$ = 4770 $\overline{M}w$ = 11,000 | Magie 535 | 127,000/60% |
| III | iBMA/iBOMA/VT/MAA 55/19/24/2 Calculated $T_g$ = 81° C. $\overline{M}n$ = 2600 $\overline{M}w$ = 8300 | Magie 535 | 128,000/60% |
| IV | iBMA/iBOMA/MMA/MAA 59/29/10/2 Calculated $T_g$ = 85° C. $\overline{M}n$ = 4100 $\overline{M}w$ = 10,500 | Magie 535 | 178,000/60% |
| V | iBMA/iBOMA/MAA/t-BAEMA 59/29/10/2 Calculated $T_g$ = 82° C. $\overline{M}n$ = 3100 $\overline{M}w$ = 8700 | Magie 535 | 170,000/60% |

EXAMPLE VI-VIII

All of these products had the composition iBMA/iBOMA/MAA/t-BAEMA in the ratios 68/28/1/3 using Magie Oil 535 as the solvent at 150° C. with tertiary butyl peracetate at a 2.5% level as the initiator, and the monomer being added over 5 hours. There was a single chase using additional 1.25% tertiary butyl peracetate at 130° C., followed with a vacuum strip of residual monomer. The calculated $T_g$ of the polymer is 78° C.

| Example | % Solids Prepn. | 25° C. Viscosity 60% solids | $\overline{M}w$ | $\overline{M}n$ |
|---|---|---|---|---|
| VI | 80 | 1460000 | 7690 | — |
| VII | 80 | 1610000 | 10900 | 4380 |
| VIII | 75* | 1840000 | 10900 | 3910 |

*Blend of xylene/M535 - 60/40; xylene removed with residual monomers in vacuum strip

EXAMPLES IX-XVIII

These products are prepared similarly, of iBMA/iBOMA/MAA in the ratio of 69/29/2, the calculated $T_g$ being 80° C. In some cases such as Examples XI, XII, XIV, XV, and XVI, two chaser catalysts were used, one after the other, at temperatures of 150° or 130° C., in some cases with tertiary butyl peracetate and in others with tertiary butyl benzoate.

|  | % Solids of Prepn. | Prepn. Solvent | T Reaction °C. | Initiator | Wt. % Initiator | Vacuum Monomer Strip | 25° C. Viscosity 60% Solids cps. | $\overline{M_w}$ | $\overline{M_n}$ |
|---|---|---|---|---|---|---|---|---|---|
| Example | | | | | | | | | |
| IX | 70 | M535[2] | 150 | BPAC[3] | 2.70 | no | 51000 | 5230 | — |
| X | 70 | M535 | 130 | BPOC[4] | 4.0 | no | 450000 | 11400 | — |
| XI | 80 | M535 | 150 | BPAC | 2.25 | yes | 256000 | 7050 | — |
| XII | 80 | M535 | 150 | BPAC | 1.75 | yes | 920000 | 8760 | — |
| XIII | 65 | M535 | 150 | BPAC | 1.0 | no | 220000 | 8200 | — |
| XIV | 80 | M535 | 150 | BPBS | 2.25 | yes | 260000 | 8150 | — |
| XV | 80 | M535 | 150 | BPB[5] | 2.50 | yes | 123000 | 7490 | — |
| XVI | 80 | M535 | 130 | BPB | 2.50 | yes | 240000 | 13100 | 4530 |
| XVII | 75 | M535[7] | 150 | BPB | 2.50 | yes | 140000 | 10200 | 4240 |
| XVIII | 75 | M535[7] | 150 | BPAC | 2.75 | yes | 150000 | 8330 | 2050 |

[2]M535 is Magie Oil 535
[3]BPAC is t-butyl peracetate
[4]BPOC is t-butyl peroctoate
[5]BPB is t-butyl perbenzoate
[7]Solvent 60/40/M535/Xylene The viscosity of the product of Example XVI was determined at 55% solids rather than 60% solids.

EXAMPLES XIX–XXVI

These products were prepared similarly to Example XV using two chases with tertiary butyl perbenzoate.

These examples demonstrate that when a combination of isobutyl methacrylate and methyl methacrylate is used along with isobornyl methacrylate and methacrylic acid no more than about 5% MMA may be used.

| Example | Composition (Wt. %) | | | | Viscosity 60% Solids, cps. | $\overline{M_w}$ | Sol. in M535 | Calc. $T_g$ |
|---|---|---|---|---|---|---|---|---|
| | iBMA | iBOMA | MAA | MMA | | | | |
| XIX | 69 | 29 | 2 | — | 131000 | 12000 | yes | |
| XX | 66 | 29 | 5 | — | 2 × 10⁶ | 7370 | yes | |
| XXI | 69 | 14.5 | 2 | 14.5 | — | 9410 | no | |
| XXII | 69 | 19 | 2 | 10 | — | — | no | |
| XXIII | 69 | 24 | 2 | 5 | 190000 | — | yes | |
| XXIV | 59 | 29 | 2 | 10 | — | 9490 | no | |
| XXV | 20 | 78 | 2 | — | 2 × 10⁶ | — | yes | |
| XXVI | — | 78 | 2 | 20 | 2 × 10⁶ | — | yes | |

EXAMPLES XXVII–XXXV

This series of examples demonstrates utilizing vinyl aromatic monomers with and without isobornyl methacrylate. For styrene and isobutyl methacrylate combined with isobornyl methacrylate and methacrylic acid, there must be at least about 20% isobornyl methacrylate present. When vinyl toluene is used in the combination, the isobornyl methacrylate may be omitted entirely, thus making vinyl toluene preferable to styrene.

| Example | Composition (Wt. %) | | | | | | Viscosity 60% Solids cps. | $\overline{M_w}$ | Sol. in M535 | Calc. $T_g$ |
|---|---|---|---|---|---|---|---|---|---|---|
| | iBMA | iBOMA | MAA | Sty. | Vinyl Toluene | MAA | | | | |
| XXVII | 69 | 29 | 2 | — | — | — | 131000 | 12000 | yes | |
| XXVIII | 40 | 18 | 2 | 40 | — | — | 127000 | — | yes | |
| XXIX | 40 | — | 2 | 58 | — | — | — | — | no | |
| XXX | 45 | 29 | 2 | 24 | — | — | 66000 | 4810 | yes | |
| XXXI | 50 | 24 | 2 | 24 | — | — | 23000 | 4420 | yes | |
| XXXII | 55 | 19 | 2 | 24 | — | — | 68000 | 6350 | yes | |
| XXXIII | 55 | 19 | 2 | — | 24 | — | 12800 | 4300 | yes | |
| XXXIV | 69 | — | 2 | — | 29 | — | 57000 | 6600 | yes | |
| XXXV | 45 | 19 | 2 | — | 24 | 10 | 33250 | 4650 | yes | |

EXAMPLES XXXVI–XXXIX

These examples further illustrate iBOMA-free polymers.

| XXXVI | Composition | iBMA/VT/MAA 29/69/2 |
|---|---|---|
| | | Solids 60% |
| | | Visc.: 136,000 cps. |
| | | Calc. $T_g$: 79° C. |
| | | Solvent: Magie Oil 535 |
| | | Mw 7400 |
| XXXVII | Composition | iBMA/DCPMA/t-BAEMA/MAA 68/28/3/1 |
| | | Solids 60% |
| | | Visc.: 160,000 cps. |
| | | Calc. $T_g$: 63° C. |
| | | Solvent: Magie Oil 535 |
| | | Mw 5600 |
| XXXVIII | Compositon | iBMA/MAA 98/2 |
| | | Solids 67% |
| | | Visc.: 500,000 cps. |
| | | Calc. $T_g$: 53° C. |
| | | Solvent: Magie Oil 535 |

| | | |
|---|---|---|
| | | $\overline{\text{Mw}}$ 7800 |
| XXXIX | Composition | s-BMA/MAA 98/2 |
| | | Solids 64% |
| | | Visc.: 28,000 cps. |
| | | Calc. $T_g$: 63° C. |
| | | Solvent: Magie Oil 535 |
| | | $\overline{\text{Mw}}$ 3800 |

EXAMPLE XL

Quick-Set Inks

Blue Ink Based on Polymers 6[a] (or 7[b])

[a]iBMA/iBOMA/MAA (Polymer 6)
69/29/2
Calculated $T_g = 79°$ C.
$\overline{\text{Mw}} = 7,000-8,500$;
$\overline{\text{Mn}} = 2,000-2,500$
[b]iBMA/iBOMA/t-BAEMA/MAA (Polymer 7)
68/28/3/1
Calculated $T_g = 76°$ C.
$\overline{\text{Mw}} = 8,000$;
$\overline{\text{Mn}} = 3,500$
These polymers are prepared similarly to the foregoing.

Formulation:
| | | |
|---|---|---|
| Phthalo Blue | | 14.7 |
| Polymer 6 (60% solids in Magie Oil 535) | | 76.7 |
| Magie Oil 535 | | 8.6 |
| | Total | 100.0 |

Constants:
| | |
|---|---|
| Total Solids % | 60.7 |
| Pigment/Binder Ratio | 24/76 |

Red Ink Based on Polymer 6 or 7
Formulation:
| | | |
|---|---|---|
| Lithol Rubine (Red pigment) | | 14.7 |
| Polymer 6 (60¢ solids in Magie Oil 535) | | 76.7 |
| Magie Oil 535 | | 8.6 |
| | Total | 100.0 |

Constants:
| | |
|---|---|
| Total Solids | 60.7 |
| Pigment/Binder Ratio | 24/76 |

Blue Ink Based on Polymer 6 plus a Commercial Quick-Set Varnish
Formulation:
| | | |
|---|---|---|
| Phthalo Blue | | 16.7 |
| Polymer 6 (60% Solids in Magie 535) | | 20.1 |
| Magie Oil 535 | | 3.2 |
| Uroset (Urethane - modified alkyd to give fast drying)[1] | | 50.3 |
| Alvco 1964[1] (Waxy slip aid) | | 7.4 |
| Cobalt Naphthenate (6% metal) | | 1.7 |
| Manganese Naphthenate (6% metal) | | 0.6 |
| | Total | 100.0 |

Constants:
| | |
|---|---|
| Total Solids | 66.1% |
| Pigment/Binder Ratio | 25/75 |

[1]Lawter Chemical Co.

EXAMPLE XLI

Heat-Set Inks

Black Ink Based on Polymer 6
Formulation:
| | | |
|---|---|---|
| Carbon Black | | 10.0 |
| Polymer 6 (60% Solids in Magie Oil 470) | | 84.4 |
| Magie Oil 470 | | 2.7 |
| Microfive VI-FS[2] (Waxy slip aid) | | 2.9 |
| | Total | 100.0 |

Constants:
| | |
|---|---|
| Total Solids | 63.6% |
| Pigment/Binder Ratio | 16/84 |

[2]Dura Commodities Corp.

EXAMPLE XLII

Quick Set Ink Formulations Using non-iBCMA Polymers

| | |
|---|---|
| Phthalo Blue | 16.3 |
| Polymer 8 (60% in Magie Oil 535) | 59.3 |
| Synthetic Wax | 2.9 |
| Micronized Fluorocarbon | 2.9 |
| Tridecyl Alcohol | 4.1 |
| Magie Oil 535 | 14.5 |
| | 100.0 |
| Phthalo Blue | 15.5 |
| Polymer 11 (64% in Magie Oil 535) | 59.5 |
| Synthetic Wax | 2.7 |
| Micronized Fluorocarbon | 2.8 |
| Tridecyl Alcohol | 3.5 |
| Magie Oil 535 | 16.0 |
| | 100.0 |

The following is a sample calculation of the glass transition temperature of polymer No. 6, iBMA/iBOMA/MAA//69/29/2, using the Fox equation.

The Fox equation is:

$$\frac{1}{Tg} = \frac{\text{wt. fraction Monomer \#1}}{Tg \text{ Homopolymer \#1}} + \frac{\text{wt. fraction Monomer \#2}}{Tg \text{ Homopolymer \#2}} + \text{etc.}$$

The temperatures in the equation are degrees Kelvin. Thus, for copolymer #6, $$\frac{1}{Tg} = \frac{.69}{332} + \frac{.29}{443} + \frac{.02}{501}$$

$$Tg = 352° \text{ K.} = 79° \text{ C.}$$

We claim:

1. A printing ink containing a colorant, a polymer, and a hydrocarbon solvent comprising by weight at least 70% of aliphatic hydrocarbons and no more than about 25% of aromatic hydrocarbons, said solvent having a kauri-butanol number of between 18 and 31, said polymer being an addition polymer of polymerized ethylenically unsaturated monomers dissolved in said solvent, the $\overline{\text{Mw}}$ of the polymer being from 1,000 to 15,000 as determined by gel permeation chromatography, and the calculated $T_g$ of the polymer being from 40° C. to 200° C., and in which the monomers from which the polymer is prepared include at least about 15% of at least one of isobutyl methacrylate, s-butyl methacrylate, isobornyl methacrylate, isobornyl acrylate, dicyclopentenyl methacrylate, dicyclopentenyl acrylate, dicyclopentenylethoxy methacrylate, dicyclopentenylethoxy acrylate, dicyclopentenylneopentoxy methacrylate, dicyclopentenylneopentoxy acrylate, and a vinyl aromatic monomer, with the proviso that no more than about 40% of the total monomers is used in the form of styrene or isobornyl methacrylate, said copolymer containing no more than about 5% methyl methacrylate.

2. The ink of claim 1 in which the colorant comprises a pigment, the $\overline{\text{Mw}}$ of the copolymer is at least 4,000, said Tg is between 50° and 120° C., the kauri-butanol value of said solvent is from 21 to 28, the pigment-:binder ratio is between about 0.01:1 and 2:1, weight basis, and at least one of isobutyl methacrylate and isobornyl methacrylate is present.

3. The ink of claim 2 in which the polymer is predominantly of isobutyl methacrylate and vinyl toluene, with greater than 0% to about 5% of an amine-containing or carboxylic acid-containing monomer no more than 5% of methyl methacrylate being included.

4. The ink of claim 2 in which the polymer is predominently of two or more of isobutyl methacrylate, isobornyl methacrylate, styrene, and vinyl toluene, with 0–5% of one or more of an amine-containing or carboxylic acid-containing monomer.

5. A printing ink containing a hydrocarbon solvent and an addition copolymer binder dissolved therein, said solvent having a kauri-butanol number of between 18 and 31, said solvent comprising at least about 70% of saturated hydrocarbons, said copolymer being composed of from about 1% to about 40% isobornyl methacrylate mer units, the remainder of said polymer being polymerized ethylenically unsaturated monomers of a nature and present in a quantity which do not detract from said solubility, the $\overline{M}w$ of the polymer being from about 1,000 to about 15,000, the calculated $T_g$ of the polymer being from about 40° C. to 200° C.

6. The ink of claim 5 in which the polymerized isobornyl methacrylate is present in an amount of from 5% to 35%, the $\overline{M}w$ of the copolymer is between about 4,000 and about 12,000, said $T_g$ is between about 50° and about 120° C., and said kauri-butanol value is from about 21 to about 28.

7. The ink of claim 1 in which polymerized isobutyl methacrylate is present in said copolymer in an amount of between 35% and 75% and the isobornyl methacrylate is present in an amount between about 15% and about 35%.

8. The ink of claim 7 in which one or more of the additional monomers, dicyclopentenyl methacrylate and acrylate, dicyclopentenylethoxy methacrylate and acrylate, dicyclopentenylneopentoxy methacrylate and acrylate, isobornyl acrylate, a vinyl aromatic monomer, a carboxylic acid monomer or a nitrogen-containing monomer is included.

9. The ink of claim 7 containing about 0.5% to 5% of at least one of unsaturated amino monomer units and unsaturated acid monomer units.

10. The ink of claim 9 which consists essentially of isobutyl methacrylate, isobornyl methacrylate, and one or more of methacrylic acid, acrylic acid, itaconic acid, tert-butylaminoethyl methacrylate, dimethylaminoethyl methacrylate, and 2-(3-oxazolidinyl)ethyl methacrylate.

* * * * *